US008248270B2

(12) United States Patent
Nieves

(10) Patent No.: US 8,248,270 B2
(45) Date of Patent: Aug. 21, 2012

(54) TACTILE WARNING SYSTEM FOR A VEHICLE

(76) Inventor: Verne Nieves, Cape Coral, FL (US)

( * ) Notice: Subject to any disclaimer, the term of this patent is extended or adjusted under 35 U.S.C. 154(b) by 406 days.

(21) Appl. No.: 12/476,629

(22) Filed: Jun. 2, 2009

(65) Prior Publication Data

US 2010/0259417 A1 Oct. 14, 2010

Related U.S. Application Data

(60) Provisional application No. 61/167,883, filed on Apr. 9, 2009.

(51) Int. Cl.
*G08G 1/09* (2006.01)

(52) U.S. Cl. ........ 340/905; 340/901; 340/904; 340/936; 342/20

(58) Field of Classification Search .......... 340/901–906, 340/936, 925.5, 435; 342/20, 56, 175, 176
See application file for complete search history.

(56) References Cited

U.S. PATENT DOCUMENTS

| 5,497,148 | A | 3/1996 | Oliva |
| 6,285,279 | B1 * | 9/2001 | Yamazaki ..................... 340/432 |
| 6,327,932 | B1 | 12/2001 | Onodera et al. |
| 6,861,970 | B1 | 3/2005 | Garland |
| 7,369,042 | B2 | 5/2008 | Osaka et al. |
| 7,532,130 | B2 * | 5/2009 | Curtis .......................... 340/902 |
| 7,589,643 | B2 * | 9/2009 | Dagci et al. .................. 340/905 |
| 7,937,219 | B2 * | 5/2011 | Ichinose et al. .............. 701/301 |
| 2004/0140892 | A1 * | 7/2004 | Hanood ........................ 340/511 |

* cited by examiner

*Primary Examiner* — Brent Swarthout
(74) *Attorney, Agent, or Firm* — Fraser Clemens Martin & Miller LLC; James D. Miller

(57) ABSTRACT

A warning system adapted to detect a plurality of input signals, identify the input signals as being associated with a vehicular speed measuring system used by law enforcement, and provide a tactile warning to a driver of the vehicle, is disclosed. The warning system includes a sensor to detect an input signal associated with a transmitter, analyze the input signal, and generate a warning signal in response to the analysis of the input signal, a controller to receive the warning signal, analyze the warning signal, and generate a control signal in response to the analysis of the warning signal, and a tactile feedback generator to generate a tactile alert through a vehicle control device in response to the control signal.

11 Claims, 3 Drawing Sheets

TACTILE WARNING SYSTEM FOR A VEHICLE

CROSS-REFERENCE TO RELATED APPLICATION

This application claims the benefit of U.S. Provisional Patent Application No. 61/167,883 filed on Apr. 9, 2009.

FIELD OF THE INVENTION

The present invention relates to driver awareness systems. More particularly, the invention is directed to a warning system for indicating the reception of signals emitted by various driver awareness systems.

BACKGROUND OF THE INVENTION

As is generally known in the art, vehicle speed measuring systems may be used to determine the speed of moving objects, such as automobiles and other motorized vehicles. Speed measuring systems currently utilize either radar or laser devices in their operation. Radar-based systems typically include a microwave signal source that emits a signal having a frequency in the radio-frequency electromagnetic spectrum. The radio-frequency spectrum utilized in speed-detection radar devices is divided into a series of bands, with each band covering a range of frequencies within the radio-frequency spectrum. The frequencies of interest range from about 10.500 to 36.000 GHz., although all the frequencies within this range are not allocated for speed-detection radar devices. The bands which are allocated for this purpose include: X-band, which ranges from 10.500-10.550 GHz.; K-band, which ranges from 24.050-24.250 GHz.; and Ka band, which presently ranges 33.400-36.000 GHz. More frequencies have been added for police speed radar usage like the introduction of 34.3 GHz in the late 1980's, 34.000 GHz to 35.000 GHz in the early 1990's, and finally 33.400 GHZ to 36.000 GHz in the mid 1990's. Furthermore, radar-based systems may emit signals in either a continuous or a pulsed mode.

Operators of moving vehicles oftentimes find it useful to know when the speed of their vehicle is being monitored. Thus, electronic assemblies (i.e. RADAR and LIDAR detectors) for detecting the presence of speed detection systems have been developed and are now in common use. Typically, such assemblies include a detection means, a processing means, and a displaying means.

Additionally, current driver awareness systems provide a warning of driving hazards such as foreign objects in a drive path, dangerous road conditions, and known locations of speed/red-light cameras.

However, current electronic detector assemblies only provide a visual or audio alert to the driver for indicating that an input signal has been identified. In certain instances, the driver may not receive the alert due to other visual and audio distractions (e.g. radio, navigation system).

An object of the proposed invention is to incorporate a stand-alone detection device that is wireless, and positioned, attached to, and/or integrated into a vehicular control device (e.g steering wheel, hand grips) that would provide a discrete indication to the driver of such vehicle of the reception of input signals associated with speed measuring systems and driver awareness systems.

It would be desirable to develop a warning system to detect a plurality of input signals, identify the input signals as being associated with a pre-determined transmitter, and provide a tactile warning to a driver of the vehicle.

SUMMARY OF THE INVENTION

Concordant and consistent with the present invention, a warning system to detect a plurality of input signals, identify the input signals as being associated with a pre-determined transmitter, and provide a tactile warning to a driver of the vehicle, has surprisingly been discovered.

In one embodiment, a warning system comprises: a sensor to detect an input signal associated with a transmitter, analyze the input signal, and generate a warning signal in response to the analysis of the input signal; a controller to receive the warning signal, analyze the warning signal, and generate a control signal in response to the analysis of the warning signal; and a tactile feedback generator to generate a tactile alert through a vehicle control device in response to the control signal.

In another embodiment, a warning system comprises: a sensor to detect an input signal associated with at least one of a vehicle speed measurement system used by law enforcement, a driving hazard warning system, a driver awareness system, a transportation database system, and a traffic information warning system, analyze the input signal, and generate a warning signal in response to the analysis of the input signal; a controller to receive the warning signal, analyze the warning signal, and generate a control signal in response to the analysis of the warning signal; and a tactile feedback generator to generate a tactile alert through a vehicle control device in response to the control signal.

The invention also provides methods for generating a tactile warning to a driver of a vehicle.

One method comprises the steps of: providing a sensor to detect an input signal associated with a transmitter, analyze the input signal, and generate a warning signal in response to the analysis of the input signal; analyzing the warning signal; and generating a tactile alert in a control device of a vehicle in response to the analysis of the warning signal.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
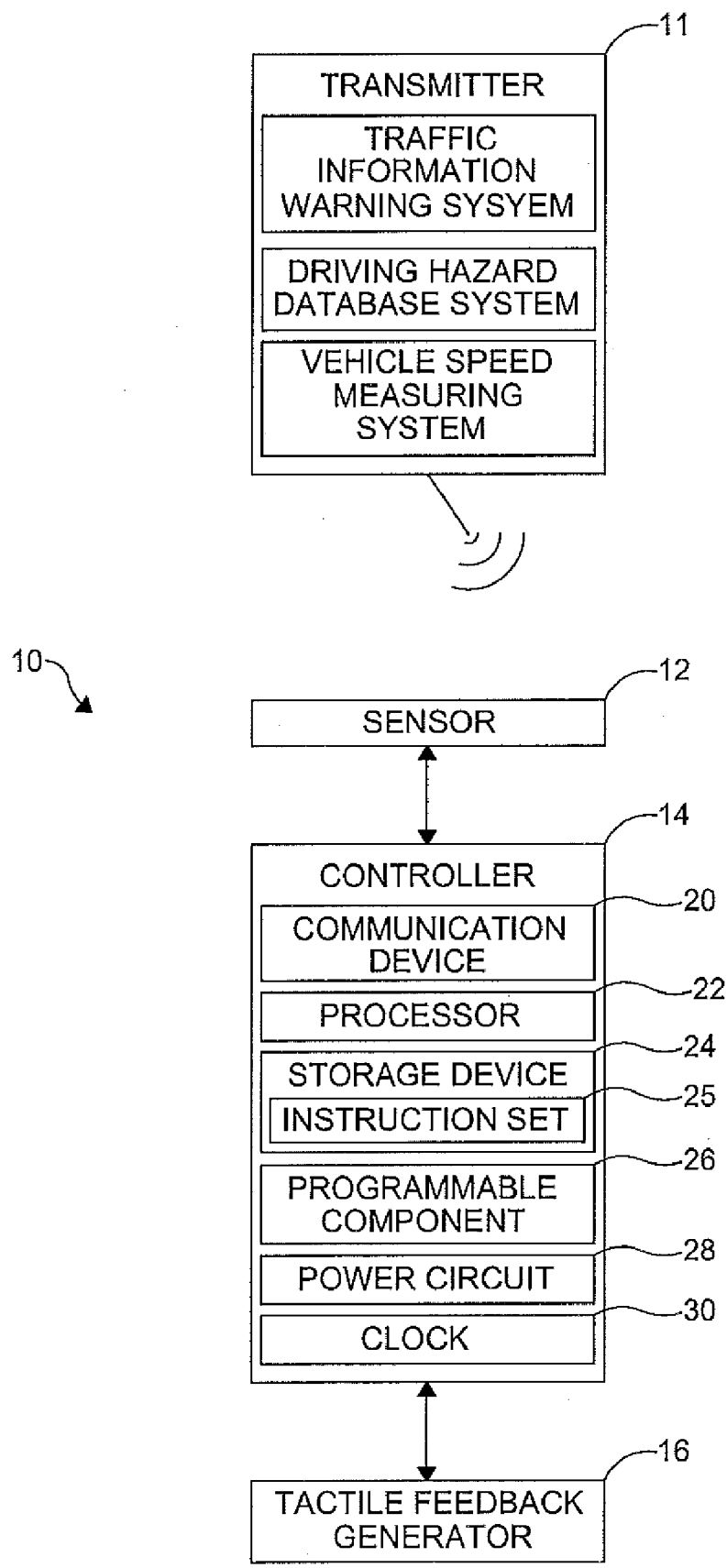
FIG. 1 is a schematic flow diagram of a warning system according to an embodiment of the present invention.
Figure 2:
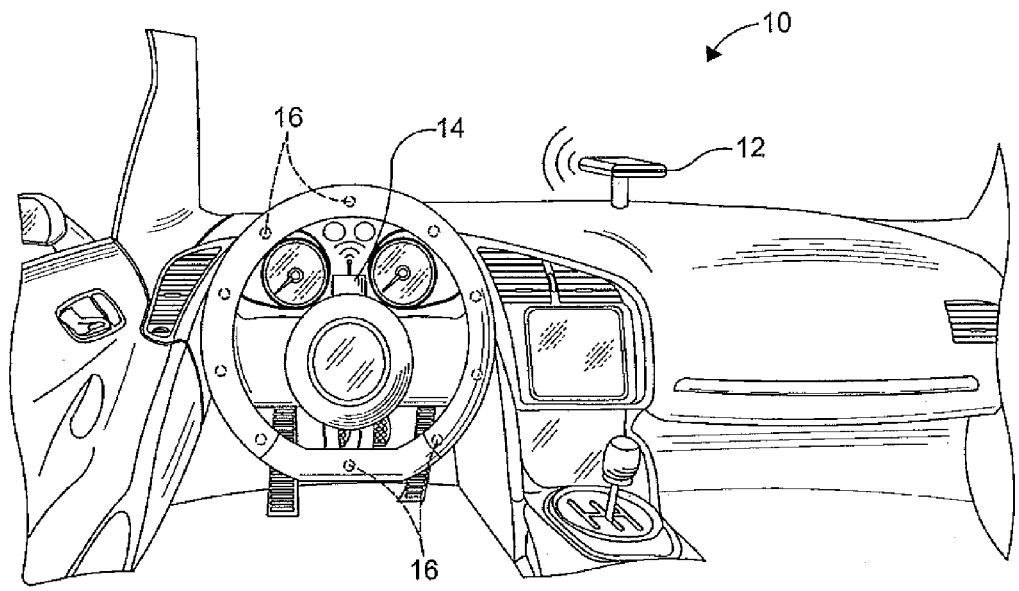
FIG. 2 is a perspective view of a vehicle cabin including the warning system of FIG. 1.

FIGS. 1 and 2 illustrate a warning system 10 according to an embodiment of the present invention. The warning system 10 is a self contained assembly coupled or intergraded with a vehicle control device such as a steering wheel of a motor vehicle and a hand grip of a motorcycle, for example. The warning system 10 is configured to receive input signals, identify the input signals as being associated with a particular transmitter 11, and provide a tactile alert to a driver of the vehicle. As shown, the warning system 10 includes a sensor 12, a controller 14, and a tactile feedback generator 16.

The sensor 12 is a detection device adapted to sense a plurality of transmitted input signals associated with the transmitter 11. As shown, the transmitter 11 is associated with at least one of a vehicle speed measurement system used by law enforcement, a driving hazard warning system, and a traffic information warning system. However, the warning system 10 may be configured to detect and identify input signals associated with other warning devices and vehicle advisory systems such as a driver awareness system, a curve speed warning system, and a collision warning system.

As a non-limiting example, the sensor 12 is a RADAR detector for sensing RADAR bands including K, KA, and X bands. As a further example, the sensor 12 may be a LIDAR detector adapted to sense signals transmitted on the LIDAR laser band. It is understood that the sensor 12 may be adjusted to detect any bandwidth, frequency, or signal-type. In certain embodiments, the sensor 12 detects signals associated with traffic information warning systems similar to the system described in U.S. Pat. No. 5,497,148, hereby incorporated herein in its entirety. It is understood that the sensor 12 may be adapted to detect an input signal generated by an on-board system of the vehicle. It is further understood that any number of sensors 12 may be used.

The sensor 12 may also detect alert signals associated with a transportation database system used to store information relating to traffic cameras and driving hazards such as AURA™ (Advanced Universal Road Alert) by Cobra®, for example. In particular, transportation database systems such as AURA™ store GPS coordinates of speed/red-light cameras and driving hazards such as accident hotspots, high-risk zones, and congestion change cameras. The GPS coordinates are updated regularly and users can access the database through the Internet. Companies such as Cobra® verify North American databases with accuracy and are constantly communicating with municipalities such as police departments, traffic bureaus, state transportation agencies, and data partners.

As more clearly shown in FIG. 2, the sensor 12 is spaced from the steering wheel of the vehicle. However, the sensor 12 may be disposed in any area of the vehicle for detecting any incoming signals. As a non-limiting example, a plurality of the sensors 12 may be disposed on the steering wheel. As a further example, the sensor 12 may be integrated with a steering wheel cover adapted to be coupled to the steering wheel. It is understood that any number of sensors 12 may be used and strategically positioned to maximize the "detection" of input signals. As such, the sensor 12 has its own "detection" hardware and electronics including a wireless communications device (e.g. RF transmitter, Bluetooth® technology) adapted to transmit a warning signal to the controller 14 in response to the detection of a pre-determined input signal. It is understood that the warning signal represents the detection of an input signal within a pre-determined frequency range or meeting pre-determined detection criteria such as a particular bandwidth or unique transmission signature used by certain transmitters. It is further understood that the warning signal may include data and information representing characteristics of the received input signal such as phase, amplitude, frequency, and intensity, for example.

The sensor 12 may include a receiver (e.g. antenna, photo detector), a mixer/tuner, a microprocessor, and other Digital Signal processing devices for receiving and analyzing the input signals. In this way, the "detection phase" of the warning system 10 is provided exclusively by the electronics of the sensor 12, thereby minimizing the required hardware in the steering wheel or steering wheel cover while providing for various positioning of the sensor 12 throughout the vehicle.

The controller 14 includes a communications device 20 to receive the warning signal, a processor 22 to analyze the warning signal, and a storage device 24. The processor 22 is adapted to analyze the warning signal based upon an instruction set 25 and generate a control signal to regulate an output of the tactile feedback generator 16 (e.g. electric motor) in response to the analysis of the warning signal. As a non-limiting example, the analysis of the warning signal may include determining characteristics of the input signal such as signal type, intensity, amplitude, and frequency. As a further example, the controller 14 may analyze the warning signal to determine a position and distance of the source of the input signal relative to the vehicle. As shown, the controller 14 is disposed on a steering column of the vehicle. However, it is understood that the controller 14 may be disposed in any area of the vehicle. It is further understood that components of the controller 14 may be integrated with at least one of the sensor 12 and the tactile feedback generator 16.

The instruction set 25, which may be embodied within any computer readable medium, includes processor executable instructions for configuring the processor 22 to perform a variety of tasks. The storage device 24 may be a single storage device or may be multiple storage devices. Portions of the storage device 24 may also be located on the processor 22. Furthermore, the storage device 24 may be a solid state storage device, a magnetic storage device, an optical storage device or any other suitable storage device or system. It is understood that the storage device 24 is adapted to store the instruction set 25. Other data and information may be stored in the storage device 24, as desired.

The controller 14 may further include a programmable component 26. The programmable component 26 is in communication with the processor 22. It is understood that the programmable component 26 may be in communication with any other component of the warming system 10 such as the sensors 12 and the tactile feedback generator 16, for example. In certain embodiments, the programmable component 26 is adapted to manage and control processing functions of the processor 22. Specifically, the programmable component 26 is adapted to control the analysis of the warning signal and the generation and transmission of the control signal. The programmable component 26 provides a means for a user to actively manage the operation of the processor 22 and thereby control the resultant tactile alert generated by the warning system 10. It is understood that the programmable component 26 may be adapted to store data and information on the storage device 24 and retrieve data and information from the storage device 24. Where the controller 14 includes a programmable component 26, the analysis of the warning signal by the controller 14 may be pre-programmed. It is understood that the analysis of the warning signal and the generation and transmission of the control signal may be adjusted in real-time or pre-programmed by the original equipment manufacturer (OEM) or user. It is further understood that the functions of the controller 14 may have stored settings that may be recalled and processed, as desired.

In certain embodiments, the controller 14 is enclosed in a housing and includes an electrical power circuit 28. For example, the electrical power circuit 28 includes a source of electrical power such as a battery, and an on/off power switch. It is understood that the power source can be a rechargeable battery using recharging means or a single use disposable power source. It is further understood that the controller 14 may include a clock 30 having suitable precision for the measurement of the arrival of radar and laser signals at the sensor 12.

The tactile feedback generator 16 is disposed adjacent the vehicle control device such as a steering wheel for a vehicle and a motorcycle hand grip, for example. As a non-limiting example, the tactile feedback generator 16 may be integrated with the vehicle control device. As a further example, the tactile feedback generator 16 may be disposed in a steering wheel cover, wherein the cover is coupled to the steering wheel. In certain embodiments, the tactile feedback generator 16 is an electric motor adapted to generate a vibration or "tactile" sensation. However, it is understood that the tactile feedback generator 16 may be any device, mechanism, or system adapted to generate a vibration in the vehicle control device such as an electro-mechanical vibration device, for example. For example, the tactile feedback generator 16 is a conventional device for providing vibrations having an amplitude and frequency suitable for touch sensation to the hands and finger tips and providing an identifiable tactile indication to the driver. The tactile feedback generator 16 can also communicate additional warnings such as a low battery voltage, a vehicle condition, a status of the sensor 12 by diagnostic vibrations to validate the operational status to the driver, and discrete vibrations for the detection of laser signals versus radar signals.

In use, the sensor 12 detects the presence of the input signals transmitted within specific pre-determined ranges of signal frequencies. It is understood that the sensor 12 may be adapted to detect the input signals transmitted as laser light. In certain embodiments, when a power and/or intensity of the input signal is increasing relative to the vehicle, the warning system 10 can be programmed to initiate an additional or heightened state of indication. Where the sensor 12 detects the input signal transmitted within a pre-determined range, the sensor transmits the warning signal to the controller 14. As such, the controller 14 receives the warning signal, analyzes the warning signal, and transmits the control signal in response to the analysis of the warning signal. The control signal is received by the tactile feedback generator 16 for regulating a tactile alert (e.g. vibration) generated in the steering wheel or other vehicle control device associated with the tactile feedback generator 16. Accordingly, the driver is alerted to the detected input signal through the tactile alert in the steering wheel of the vehicle.

Figure 3:
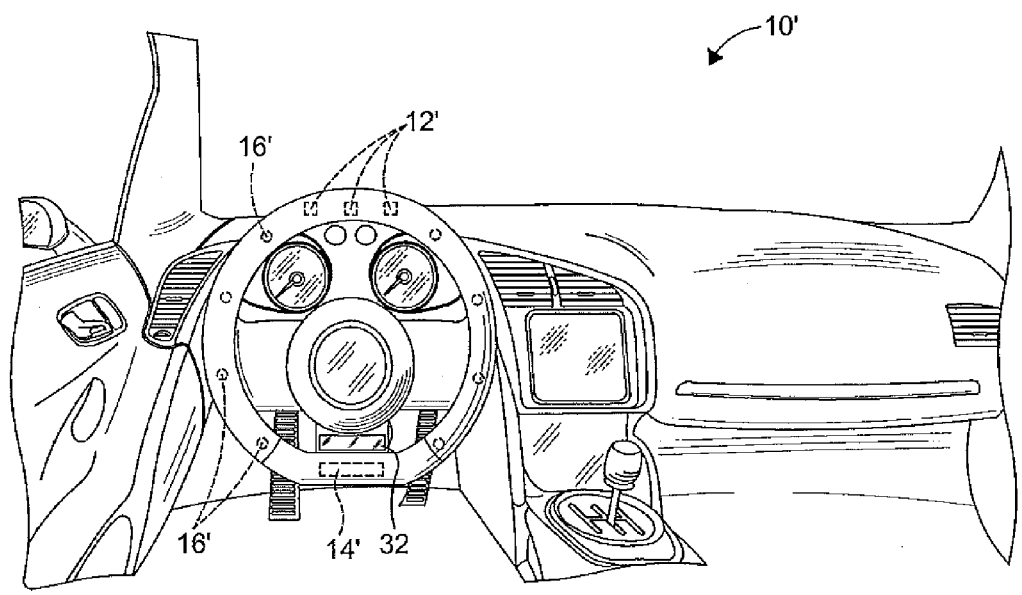
FIG. 3 is a perspective view of a vehicle cabin including a warning system according to another embodiment of the present invention.

FIG. 3 illustrates a warning system 10' according to another embodiment of the present invention similar to the warning system 10 of FIGS. 1 and 2, except as described below. Structure repeated from the description of FIGS. 1 and 2 includes the same reference numeral. Variations of structure shown in FIGS. 1 and 2 include the same reference numeral and a prime (') symbol.

As shown, the warning system 10' is completely integrated with a steering wheel of a vehicle. Specifically, the warning system 10' includes a plurality of sensors 12', a controller 14', and a plurality of tactile feedback generators 16 disposed in the steering wheel. However it is understood that each of the sensors 12', the controller 14', and the tactile feedback generators 16 may be integrated with a steering wheel cover and coupled to the steering wheel. It is further understood that any number of the sensors 121 may be used and strategically positioned to maximize the "detection" of radar and laser signals.

Each of the sensors 12' has its own "detection" hardware and electronics including a communications device (e.g. hard wire, RF transmitter, Bluetooth® technology) adapted to transmit a warning signal to the controller 14' in response to the detection of a pre-determined input signal. Specifically, the sensor 12 may include a receiver (e.g. antenna, photo detector), a mixer/tuner, a microprocessor, and other Digital Signal processing devices for receiving and analyzing the input signals.

The warning system 10' also includes a display 32 disposed adjacent the steering wheel. The display is in data communication with the controller 14' and adapted to transmit visual warnings to the driver. As a non-limiting example, the display 32 is an array of Light Emitting Diodes (LEDs) with graphical indicia representing a detection of an input signal. However, any display may be used to communicate a visual warning to the driver such as Liquid Crystal and back-lit screens, for example.

In use, the sensors 12' detect the presence of the input signals transmitted within specific ranges of signal frequencies. It is understood that the sensors 12' may be adapted to detect the input signals transmitted as at least one of laser light, radio-frequency signals, and signals within conventional satellite bandwidths. In certain embodiments, when a power and/or intensity of the input signal is increasing relative to the vehicle, the warning system 10' can be programmed to initiate an additional or heightened state of indication. Where the sensors 12' detect the input signal transmitted within a pre-determined range, the sensors 12' transmit the warning signal to the controller 14'. The controller 14' receives the warning signal, analyzes the warning signal, and transmits the control signal in response to the analysis of the warning signal. The control signal is received by the tactile feedback generators 16 for regulating a tactile alert (e.g. vibration) generated in the steering wheel associated with the tactile feedback generator 16. Accordingly, the driver is alerted to the detected input signal through the tactile alert in the steering wheel of the vehicle. Additionally, the controller 14' generates a visual feedback to the driver via the display 32.

Figure 4:
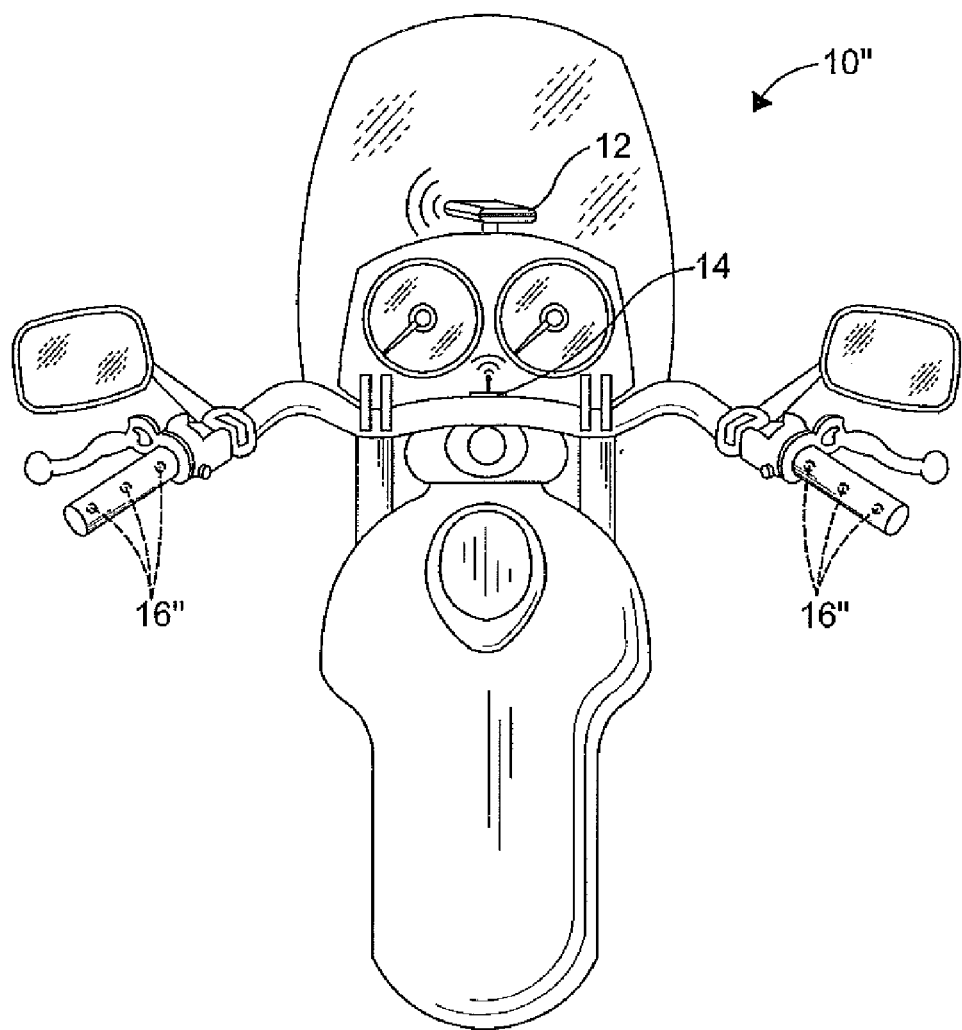
FIG. 4 is a perspective view of a motorcycle including a warning system according to yet another embodiment of the present invention.

FIG. 4 illustrates a warning system 10' according to another embodiment of the present invention similar to the warning system 10 of FIGS. 1 and 2, except as described below. Structure repeated from the description of FIGS. 1 and 2 includes the same reference numeral. Variations of structure shown in FIGS. 1 and 2 include the same reference numeral and a double-prime (") symbol.

As shown, the warning system 10" is integrated with a motorcycle. In particular, a plurality of tactile feedback generators 16" are disposed in the hand grips of the motorcycle to provide direct tactile contact with the hands of an operator. It is understood that the tactile feedback generators 16" may be disposed in a removable portion of the hand-grip for installation on to another motorcycle or hand grip bearing vehicle. It is further understood that the tactile feedback generators 16" may be disposed in a portion of the handle bars of the motorcycle, wherein any vibrations generated by the tactile feedback generators 16" are distinguishable from road vibrations.

In certain embodiments, the tactile feedback generator 16" is an electric motor adapted to generate a vibration or "tactile" sensation. However, it is understood that the tactile feedback generator 16" may be any device, mechanism, or system adapted to generate a vibration in the hand grips such as an electro-mechanical vibration device, for example. For example, the tactile feedback generator 16″ is a conventional device for providing vibrations having an amplitude and frequency suitable for touch sensation to the hands and finger tips and providing an identifiable tactile indication to the driver. The tactile feedback generator 16″ can also communicate additional warnings such as a low battery voltage, a vehicle condition, a status of the sensor 12 by diagnostic vibrations to validate the operational status to the driver, and discrete vibrations for the detection of laser signals versus radar signals.

In use, the sensor 12 detects the presence of the input signals transmitted within specific ranges of radar signal frequencies. It is understood that the sensor 12 may be adapted to detect the input signals transmitted as laser light. In certain embodiments, when a power and/or intensity of the input signal is increasing relative to the motorcycle, the warning system 10′ can be programmed to initiate an additional or heightened state of indication. Where the sensor 12 detects the input signal transmitted within a pre-determined range, the sensor transmits the warning signal to the controller 14. As such, the controller 14 receives the warning signal, analyzes the warning signal, and transmits the control signal in response to the analysis of the warning signal. The control signal is received by the tactile feedback generators 16″ for regulating a tactile alert (e.g. vibration) generated in the handgrips associated with the tactile feedback generator 16″. Accordingly, the driver is alerted to the detected input signal through the tactile alert in the hand-grips of the motorcycle.

The warning system 10, 10′, 10″ provides the tactile alert to the driver of the vehicle corresponding to the detection of the input signal generated by the pre-determined transmitter 11. Since the driver must be in physical contact with the vehicle control device (e.g. steering wheel, hand grips) to operate the vehicle, the tactile alert generated in the vehicle control device is directly transmitted to the driver. In this way, the discrete tactile alert is easily identified by the driver as a warning generated from the warning system 10, 10′, 10″.

From the foregoing description, one ordinarily skilled in the art can easily ascertain the essential characteristics of this invention and, without departing from the spirit and scope thereof make various changes and modifications to the invention to adapt it to various usages and conditions.

What is claimed is:

1. A warning system comprising:
    a sensor to detect an input signal associated with a transmitter from a vehicle speed measurement system used by law enforcement, analyze the input signal, and generate a warning signal in response to the analysis of the input signal;
    a controller to receive the warning signal, analyze the warning signal, and generate a control signal in response to the analysis of the warning signal; and
    a tactile feedback generator to generate a tactile alert through a vehicle control device in response to the control signal,
    wherein each of the sensor, the tactile feedback generator, and the controller is integral with a steering wheel cover adapted to be coupled to a vehicle steering wheel.

2. The warning system according to claim 1, wherein the input signal is at least one of an optical signal, a radio-frequency signal, and a global positioning signal.

3. The warning system according to claim 1, wherein the controller includes a programmable component to manage an operation of the controller and thereby control the tactile alert produced by the tactile feedback generator.

4. The warning system according to claim 1, wherein the tactile alert is modified in response to at least one of an intensity of the input signal and a type of the input signal.

5. A warning system comprising:
    a sensor to detect an input signal associated with a vehicle speed measurement system used by law enforcement, analyze the input signal, and generate a warning signal in response to the analysis of the input signal, the sensor including a RADAR detector for sensing at least one RADAR band;
    a controller to receive the warning signal, analyze the warning signal, and generate a control signal in response to the analysis of the warning signal; and
    a tactile feedback generator to generate a tactile alert through a vehicle control device in response to the control signal,
    wherein each of the sensor, the tactile feedback generator, and the controller is integral with a steering wheel cover adapted to be coupled to a vehicle steering wheel.

6. The warning system according to claim 5, wherein the input signal is at least one of an optical signal, a radio-frequency signal, and a global positioning signal.

7. The warning system according to claim 5, wherein the controller includes a programmable component to manage an operation of the controller and thereby control the tactile alert produced by the tactile feedback generator.

8. The warning system according to claim 5, wherein the tactile alert is modified in response to at least one of an intensity of the input signal and a type of the input signal.

9. A method for generating a tactile warning to a driver of a vehicle, the method comprising the steps of:
    providing a sensor to detect an input signal associated with a transmitter from a vehicle speed measurement system used by law enforcement, analyze the input signal, and generate a warning signal in response to the analysis of the input signal;
    analyzing the warning signal; and
    generating a tactile alert in a control device of a vehicle in response to the analysis of the warning signal,
    wherein each of the sensor, the tactile feedback generator, and the controller is integral with a steering wheel cover adapted to be coupled to a vehicle steering wheel.

10. The warning system according to claim 5, wherein the RADAR detector detects RADAR bands including at least one of K band, KA band, and X band.

11. The warning system according to claim 1, wherein the controller generates a visual feedback to the driver via a display disposed adjacent the steering wheel.

* * * * *